United States Patent [19]
Wang et al.

[11] Patent Number: 5,545,595
[45] Date of Patent: Aug. 13, 1996

[54] WAVELENGTH UP-CONVERSION TRANSPARENT GLASS CERAMICS AND A PROCESS FOR THE PRODUCTION OF THE SAME

[75] Inventors: Yuhu Wang; Junichi Ohwaki, both of Chiyoda-ku, Japan

[73] Assignees: Sumita Optical Glass, Inc.; Nippon Telegraph and Telephone Corporation, both of Tokyo, Japan

[21] Appl. No.: 400,959

[22] Filed: Mar. 8, 1995

Related U.S. Application Data

[62] Division of Ser. No. 295,463, Aug. 25, 1994, Pat. No. 5,420,080.

[30] Foreign Application Priority Data

Aug. 27, 1993 [JP] Japan ................................. 5-212572

[51] Int. Cl.$^6$ ................................. C03C 3/112
[52] U.S. Cl. ................................. 501/3; 65/33.3
[58] Field of Search ................................. 501/3; 65/33.3

[56] References Cited

U.S. PATENT DOCUMENTS

| | | | |
|---|---|---|---|
| 3,709,827 | 1/1973 | Auzel | 501/3 |
| 4,032,351 | 6/1977 | Auzel et al. | 501/3 |
| 4,537,864 | 8/1985 | Tick | 501/40 |
| 4,752,593 | 6/1988 | Tick | 501/40 |

FOREIGN PATENT DOCUMENTS

| | | |
|---|---|---|
| 2433992 | 2/1975 | Germany. |
| 1440726 | 6/1976 | United Kingdom. |

OTHER PUBLICATIONS

Wang et al., "New Transparent Vitroceramics Codoped With $Er^{3+}$ and $Yb^{3+}$ for Efficient Frequency Upconversion", Appl. Phys. Lett. vol. 63 No. 24, Dec. 13, 1993, pp. 3268–3270.

Ribeiro et al., "Structural Studies in Lead Fluorogermanate and Fluorosilicate Glasses", Journal of Alloys and Compounds, 180 (1992) pp. 117–124.

Auzel et al., "Rare Earth Doped Vitroceramics: New, Efficient, Blue and Green Emitting Materials for Infared Up–Conversion ", Journal of Electrochemical Society, vol. 122, No. 1, pp. 101–107. Jan. 1975.

*Primary Examiner*—Karl Group
*Attorney, Agent, or Firm*—Wenderoth, Lind & Ponack

[57] ABSTRACT

A high efficiency wavelength up-conversion transparent glass ceramics composition is provided containing a rare earth ion, which can be applied to short wavelength solid lasers, full color displays, infrared light detecting sensors, etc. The ceramic composition has the following chemical composition, in which fluoride fine crystals containing rare earth ions are preferentially precipitated:

| | |
|---|---|
| $SiO_2$ | 10–60 mol % |
| $AlO_{1.5}$ | 0–40 mol % |
| $GaO_{1.5}$ | 0–40 mol % |
| $PbF_2$ | 5–60 mol % |
| $CdF_2$ | 0–60 mol % |
| $GeO_2$ | 0–30 mol % |
| $TiO_2$ | 0–10 mol % |
| $ZrO_2$ | 0–10 mol % |
| $ReF_3$ or $ReO_{1.5}$ | 0.05–30 mol % |
| (Re = Er, Tm, Ho, Yb, Pr, etc.) | |

4 Claims, 5 Drawing Sheets

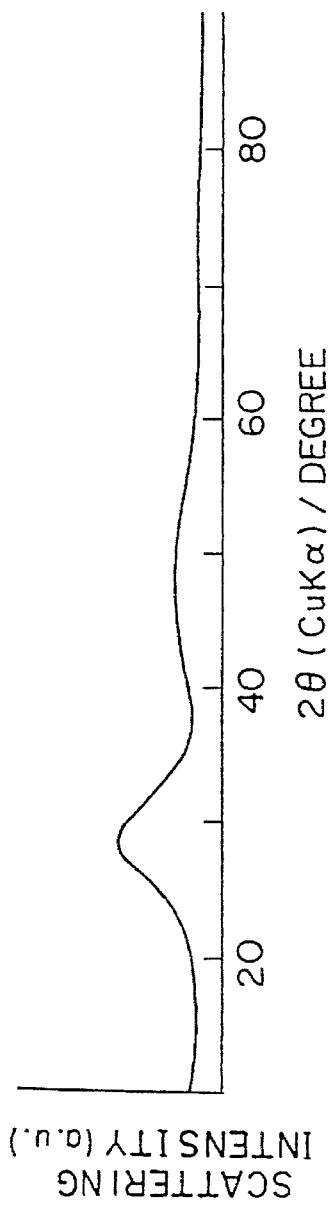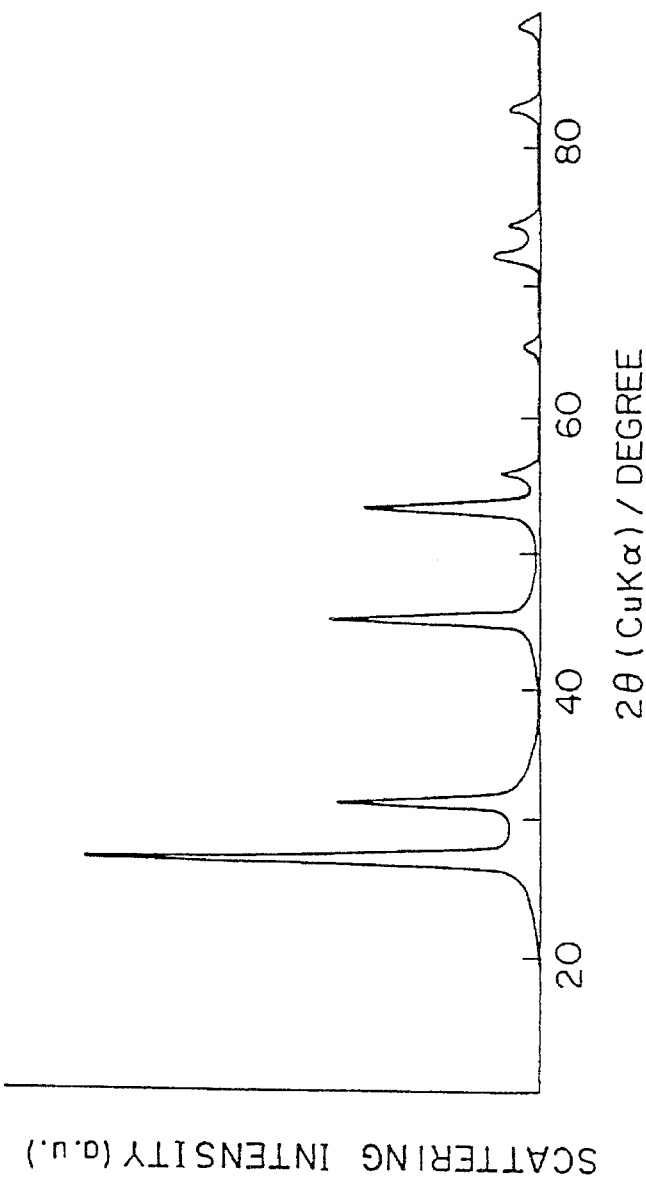

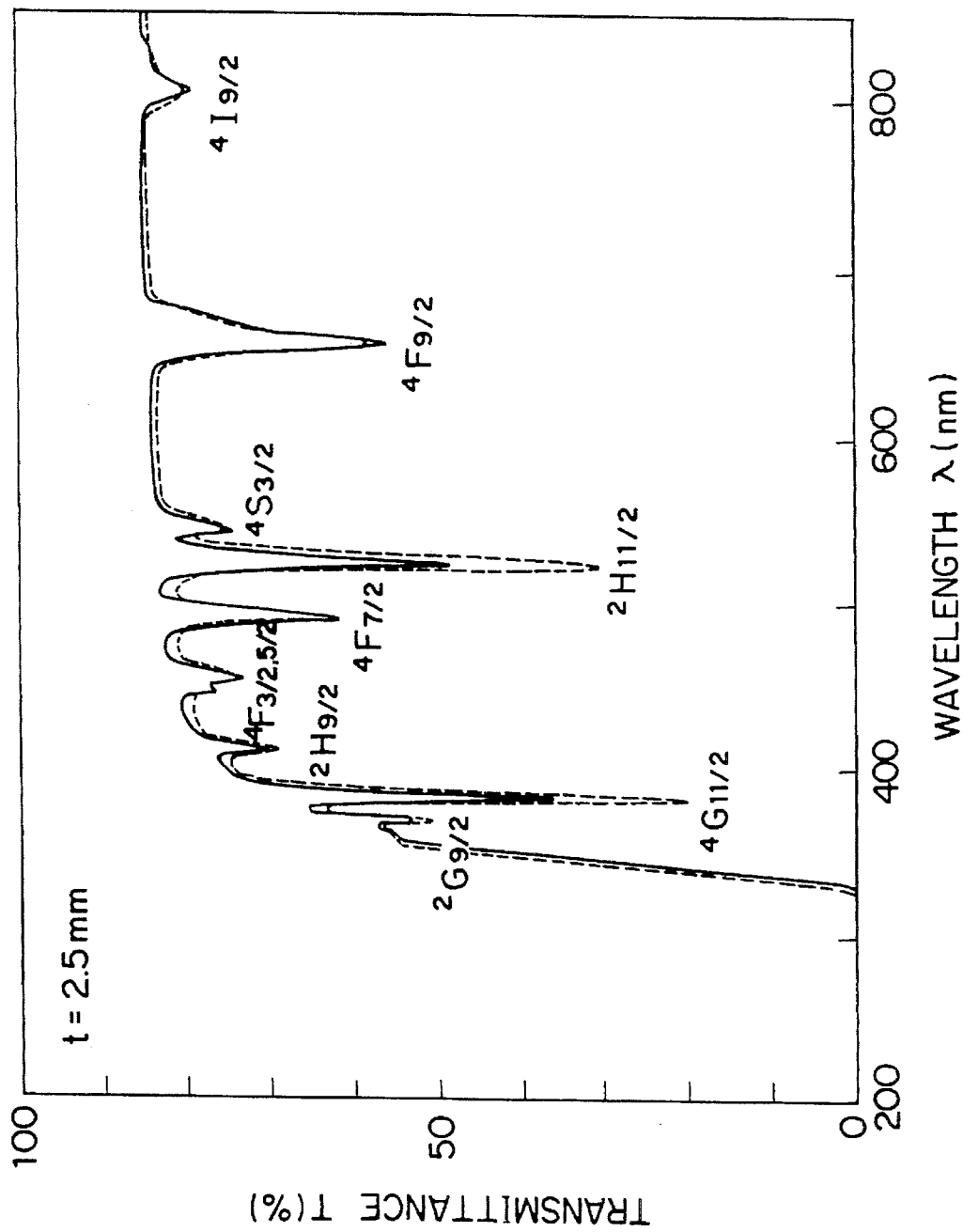

WAVELENGTH UP-CONVERSION TRANSPARENT GLASS CERAMICS AND A PROCESS FOR THE PRODUCTION OF THE SAME

This is a divisional application of Ser. No. 08/295,463, filed Aug. 25, 1994, which has issued as U.S. Pat. No. 5,420,080.

BACKGROUND OF THE INVENTION

1. Field of the Invention

This invention relates to a high efficiency wavelength up-conversion transparent glass ceramics composition containing rare earth ions, which can be applied to short wavelength solid lasers, full color displays, infrared light detecting sensors, etc. and a process for the production of the same.

2. Description of the Related Art

Lately, the wavelength up-conversion materials utilizing the electronic transition between a plurality of energy levels of rare earth ions have been watched with keen interest because they can be applied to various fields such as blue or green solid lasers, full color displays, infrared light detecting sensors, etc. As a transparent wavelength up-conversion material with a relatively high conversion efficiency, fluoride single crystals and glasses have hitherto been known. However, it is impossible to produce a fluoride single crystal having an optical homogeneity and practically large size on a commercial scale and in an economical manner, since the fluoride single crystal is excellent in conversion efficiency, mechanical strength and chemical stability, but growth of a high quality one is difficult. On the other hand, since the fluoride glass in the form of a fiber is capable of effectively sealing up an excitation light in a fiber core, a visible light fiber laser having the highest infrared conversion efficiency has been obtained at the present time. However, the fluoride glass is inferior to the fluoride single crystal in thermal, mechanical and chemical stability and has problems of durability, reliability, etc. For example, the fluoride glass tends to be deteriorated by erosion with water and when subjected to irradiation by a laser beam with a large power, it is very liable to be damaged. For the preparation of a fluoride glass fiber, furthermore, precise control of the preparation conditions such as temperature, atmosphere, etc. is indispensable, thus resulting in an increase of the production cost.

On the other hand, as a glass having a very high stability, there is known a composition, typical of optical glasses, comprising, as a predominant component, oxides. Ordinary optical glasses containing the so-called glass-forming materials having a very high chemical bonding strength, such as $SiO_2$, $GeO_2$, $AlO_{1.5}$, $BO_{1.5}$, $PO_{2.5}$, etc., exhibit high viscosity and are much more excellent in moldability, water resistance, mechanical strength, etc. than fluoride glasses containing ionic bonding compounds. In oxide glasses, however, the emission efficiency from a number of rare earth ion levels is lower by several figures than that of fluorides, and the oxide glasses are not suitable for use as applying devices utilizing emission of rare earth ions, for example, laser materials.

As the wavelength up-conversion material of the prior art, the glass consisting of high quality fluoride meets with a higher production cost and the oxide glass with high stability meets with a lower emission efficiency.

SUMMARY OF THE INVENTION

It is an object of the present invention to provide a high efficiency wavelength up-conversion transparent glass ceramics composition containing rare earth ions.

It is another object of the present invention to provide a transparent material having an excellent wavelength up-conversion property as well as a high stability, whereby the problems of the prior art can be solved.

It is a further object of the present invention to provide a process for the production of a high efficiency wave-length up-conversion transparent glass ceramics composition containing rare earth ions.

These objects can be attained by a transparent glass ceramics composition having the following chemical composition, in which fluoride fine crystals containing rare earth ions are preferentially precipitated:

| | |
|---|---|
| $SiO_2$ | 10–60 mol % (preferably 20–45 mol %) |
| $AlO_{1.5}$ | 0–40 mol % (preferably 10–30 mol %) |
| $GaO_{1.5}$ | 0–40 mol % (preferably 10–30 mol %) |
| $PbF_2$ | 5–60 mol % (preferably 20–50 mol %) |
| $CdF_2$ | 0–60 mol % (preferably 10–40 mol %) |
| $GeO_2$ | 0–30 mol % (preferably 0–20 mol %) |
| $TiO_2$ | 0–10 mol % (preferably 0–6 mol %) |
| $ZrO_2$ | 0–10 mol % (preferably 0–6 mol %) |
| $ReF_3$ or $ReO_{1.5}$ (Re = Er, Tm, Ho, Yb, Pr, etc.) | 0.05–30 mol % (preferably 0.5–20 mol %) | and by a process for the production of a transparent glass ceramics composition, comprising preparing an oxide-fluoride glass containing rare earth ions by an ordinary melting method, subjecting the glass to a heat treatment at a temperature of higher than the glass transition temperature and thereby precipitating preferentially fluoride fine crystals containing a large amount of rare earth ions.

BRIEF DESCRIPTION OF THE DRAWINGS

The accompanying drawings illustrate the principle and merits of the present invention in detail.

FIG. 2 is an illustration of the scattering curves of the material of Example 1 of (a) before heat treatment and (b) after heat treatment.

FIG. 3 is a depiction of the transmission spectra of the material of Example 1 of (a) before heat treatment and (b) after heat treatment.

DETAILED DESCRIPTION OF THE INVENTION

Figure 1A:
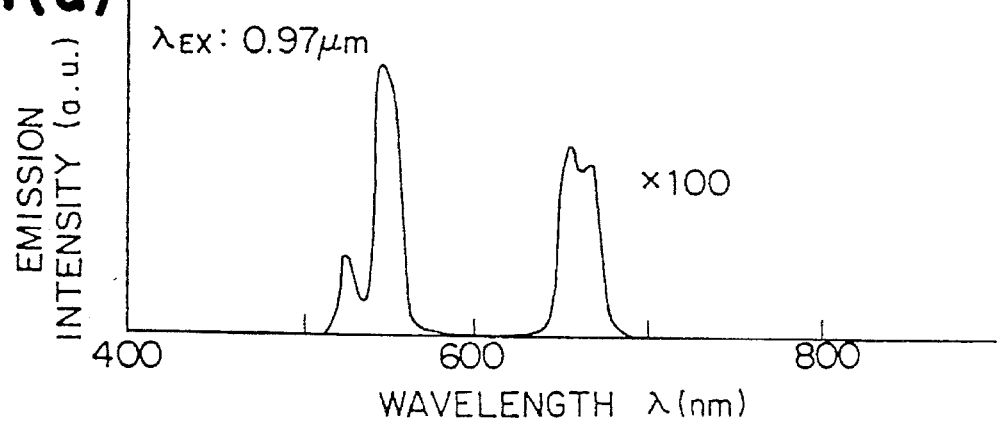
FIG. 1 is an illustration of emission spectra when Example 1 of the infrared-to-visible up-conversion material of the present invention is excited by an infrared light of wavelength 980 nm [(a) before heat treatment, (b) after heat treatment and (c) Er—Yb added fluoride glass according to Comparative Example 1].

The inventors have made various efforts to develop a high efficiency wavelength up-conversion transparent glass ceramics composition containing rare earth ion to be applied to short wavelength solid lasers, full color displays, infrared light detecting sensors, etc. and consequently, have found the transparent glass ceramics composition having the foregoing chemical composition, in which fluoride fine crystals containing rare earth ions are preferentially precipitated.

In the foregoing chemical composition according to the present invention, $SiO_2$ and $AlO_{1.5}$ or $GaO_{1.5}$ are important as glass raw materials for forming the network structure of the transparent glass matrix. With an increase of the content of $SiO_2$, the glass tends to be formed, but desired fluoride fine crystals are hard to be precipitated. In particular, when $SiO_2$ is at least 60 mol % or $AlO_{1.5}$ or $GaO_{1.5}$ is at least 40 mol %, the fine crystals cannot be precipitated and the emission efficiency is decreased. $PbF_2$ and $CdF_2$ not only promote formation of the glass, but also play an essential role of precipitating the fine crystals. When more than 60 mol % of $PbF_2$ and $CdF_2$ are added, the glass is not formed. $GeO_2$ is a component playing the same role as $SiO_2$ and even when a part of $SiO_2$ is replaced by $GeO_2$, the formation of the glass is not affected. $TiO_2$ or $ZrO_2$ is effective for the precipitation of the fine crystals even if added in a small amount and when adding at least 10 mol %, this component is not dissolved. Rare earth elements ($Re^{+3}$) are emission components, of which $Yb^{+3}$ as a sensitizer is preferably used in a larger amount, e.g. about 20 mol % and other $Re^{3+}$ elements are preferably used in an amount of up to 5 mol % so as to prevent the concentration quenching.

In the present invention, there is provided a process for the production of a transparent glass ceramics composition, comprising preparing an oxide-fluoride glass containing rare earth ions by an ordinary melting method, subjecting the glass to a heat treatment at a temperature of higher than the glass transition temperature and thereby precipitating preferentially fluoride fine crystals containing a large amount of rare earth ions. Specifically, glass-forming materials, for example, powders of $SiO_2$, $AlO_{1.5}$ and fluorides such as $PbF_2$, $CdF_2$, $ReF_3$ (rare earth element fluorides) are mixed, charged in a platinum crucible, solubilized in the air at a temperature of about 1000° C., cast in a mold of carbon and charged in an annealing furnace to remove the strain. Up to this step, substantially the same process is carried out as in the ordinary processes for the production of oxide glasses, thus obtaining transparent glasses with various shapes. When the thus resulting transparent glass is further heat treated for several hours at a temperature of higher than the glass transition temperature, at which no devitrification occurs, the emission efficiency of the rare earth elements can at once be inceased without deteriorating the transparency. In such a very simple method, a transparent body with a high rare earth emission efficiency can be obtained, because a large amount of fluoride fine crystals containing rare earth ions are precipitated in the glass by the heat treatment. Since a large amount of the fine crystal grains precipitated in the resulting transparent glass ceramics have sizes of smaller than the light wavelengths, however, scattering of visible light is so little as can be neglected and the glass apparently has a completely same transparency before and after the heat treatment, although differing in structure. Concerning the components, moreover, $GeO_2$ or $BO_{1.5}$ can be used as a raw material or raw component instead of $SiO_2$, $GaO_{1.5}$ or $TiO_2$ instead of $AlO_{1.5}$ and rare earth oxides $ReO_{1.5}$ instead of the rare earth fluorides $ReF_3$. The important point consists in stably incorporating fluorides into an oxide glass, subjecting the mixture to a heat treatment and thereby precipitating fluoride fine crystals containing rare earth ions. Heavy metal fluorides such as $PbF_2$, $CdF_2$, $TlF$, etc. are preferable as the component, since they metastably form ionic bonds with fluoride ion in the oxide glass network and function to prevent the rare earth ion from direct bonding with Si—O. The atmosphere used for melting the glass is not limited, but can be air. As the crucible, there can be used crucibles of platinum, alumina, silica, etc.

The above described production process will specifically be illustrated in the following. Powders of oxides and fluorides as raw materials are mixed, charged in a platinum crucible provided with a cover and uniformly melted at about 1000° C. When the content of $AlO_{1.5}$, $TiO_2$ or $ZrO_2$ each having a high melting point is larger, it is preferable to adjust the melting temperature to somewhat higher (less than 1200° C.). If the temperature is higher than 1200° C., however, a loss of the fluoride due to evaporation is so increased that the melt should be prevented from such a high temperature. The melting time, depending upon the amount of one batch, is generally 1 to 2 hours in the case of about 100 g, and with the increase of the amount thereof, the melting time is preferably lengthened for homogenizing the mixture. However, the maintenance of the melt for a longer period of time should be avoided since the loss of the fluorides due to evaporation is remarkable.

The glass melt is cast in a mold, solidified, annealed near the glass transition temperature (Tg), cooled therefrom to a temperature of about 50° C. lower than Tg, further heated and heat-treated at a temperature of about 100 ° C. higher than Tg and thus fine crystals are precipitated. Generally, Tg is different depending on the composition of the glass and accordingly, the heat treatment temperature is different according to the glass composition. As long as denitrification does not occur, it is preferable to effect the heat treatment at a higher temperature from the standpoint of efficiency and at a higher temperature, the heat treatment time is shorter, but in general, the heat treatment should preferably be carried out for at least 10 hours.

EXAMPLES

The present invention will now be illustrated in greater detail by the following examples, but the present invention and merits thereof are not intended to be limited by the materials, compositions and production procedures described in these examples. Of course, these examples are only given to exemplify the present invention and can variously be changed or modified without departure from the scope of the present invention.

Example 1

Powders of $SiO_2$, $Al(OH)_3$, $PbF_2$, $CdF_2$, $YbF_3$ and $ErF_3$ were weighed and mixed to give a composition of 30% $SiO_2$, 15% $AlO_{1.5}$, 24% $PbF_2$, 20% $CdF_2$, 10% $YbF_3$ and 1% $ErF_3$ (mol %). The resulting mixture was charged in a platinum crucible and melted for about 1 hour in the air at a temperature of 1050 °C. The uniformly melted mixture was cast in a mold of carbon and annealed at 400° C. The thus obtained transparent glass was further heat treated at a temperature of 470° C. for 7 hours and alowed to stand and cool at room temperature.

Figure 1B:
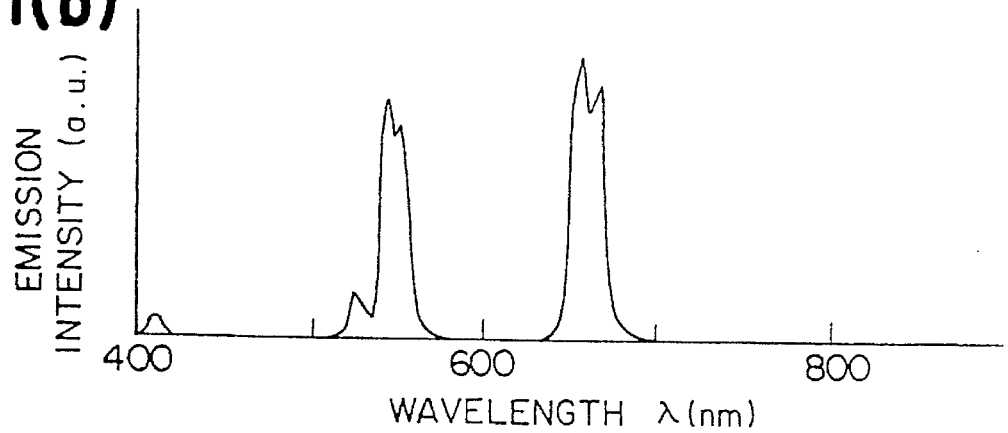

FIG. 1 shows the emission spectra when (a) the glass free from the heat treatment and (b) the same glass but heat-treated at 470° C. are irradiated by a semiconductor laser with a wavelength of 980 nm. The emissions at a wavelength band of 550 nm and 660 nm are respectively green and red emission by $Er^{3+}$ and in particular, the emission of 550 nm is expected to be applied to short wavelength lasers and the like. It is apparent from FIG. 1 that the emission intensity in the visible range is improved by at least about 100 times by the heat treatment at 470° C.

FIG. 2 shows X-ray scattering curves of the samples before and after the heat treatment in this Example. It is shown therein that the sample before the heat treatment (a) gives a broad curve characteristic of a glass, while the heat-treated sample (b) gives sharp peaks due to the presence of crystals. That is, this tells that a large amount of crystalline materials are precipitated in the glass by the heat treatment. These peaks are due to fine crystals of fluoride solid solutions of $PbF_2$, $CdF_2$, $YbF_3$, $ErF_3$, etc. and it is calculated from the half value width thereof that the size of the fine crystals is very small. i.e. in the figure of 20 nm.

FIG. 3 shows transmission spectra of the glass sample before and after the heat treatment, in which the dotted line shows the result after the heat treatment and the solid line shows that before the heat treatment. It is apparent from this figure that the transmittance is hardly changed before and after the heat treatment. Generally, when foreign matters such as crystals are precipitated in a glass, the transmission is remarkably lowered by scattering of light, but if the precipitated crystals are very small, e.g. smaller than the wavelength of light and the difference in refractive index between the fine crystals and matrix glass is small, the loss of transmission due to scattering of light can be so suppressed as can be neglected. The results are shown in FIG. 3.

Figure 4:
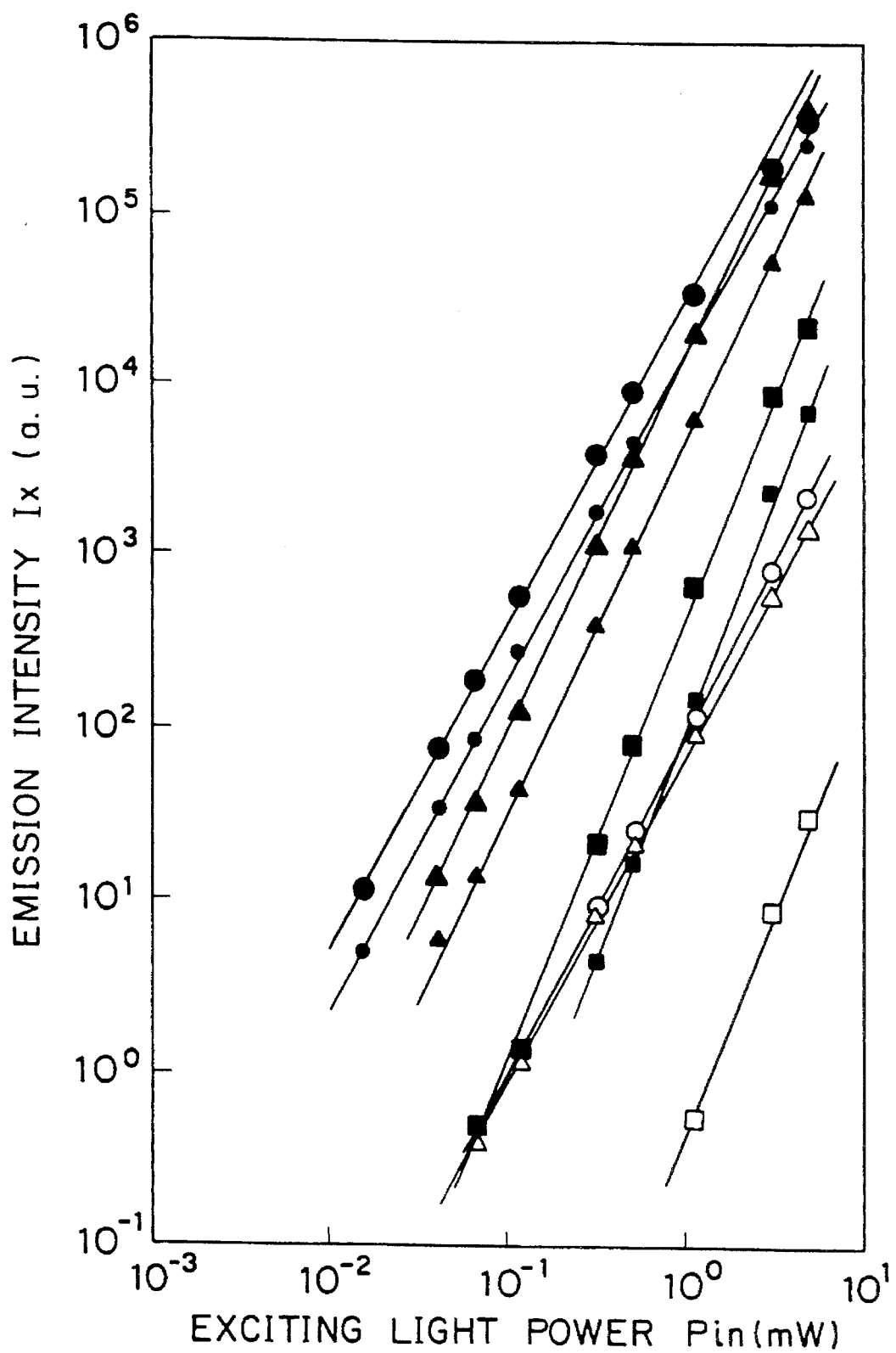
FIG. 4 shows the excitation power dependence of the emission intensity of the glass ceramics and fluoride glass according to Example 1 and Comparative Example 1.

FIG. 4 shows the excitation power dependence of the visible light emission measured using the material according to Example 1 and a semiconductor laser of 980 nm as an excitation light source. All the emissions of 550 nm and 660 nm are due to the energy transition among a plurality of energy levels of rare earth ions (in this case, $^4I_{11/2}$, $^4S_{3/2}$ and $^4F_{9/2}$ levels of $Er^{3+}$ and $^2F_{5/2}$ level of $Yb^{3+}$), which teaches the square dependence of the excitation power characteristic of the wavelength up-conversion.

In FIG. 4, the symbols and abbreviations have the following meanings:

☐: $I_{410}$, transparent glass ceramics before heat treatment
○: $I_{550}$, transparent glass ceramics before heat treatment △: $I_{660}$, transparent glass ceramics before heat treatment
■: $I_{410}$, transparent glass ceramics after heat treatment
●: $I_{550}$, transparent glass ceramics after heat treatment
▲: $I_{660}$, transparent glass ceramics after heat treatment
smaller ■: $I_{410}$, fluoride glass of the prior art
smaller ●: $I_{550}$, fluoride glass of the prior art
smaller ▲: $I_{660}$, fluoride glass of the prior art
"$I_x$": I=Intensity, x=Emission Wavelength
"Pin": P=Power (Excitation Light Power), in=input Comparative Example 1

Figure 1C:
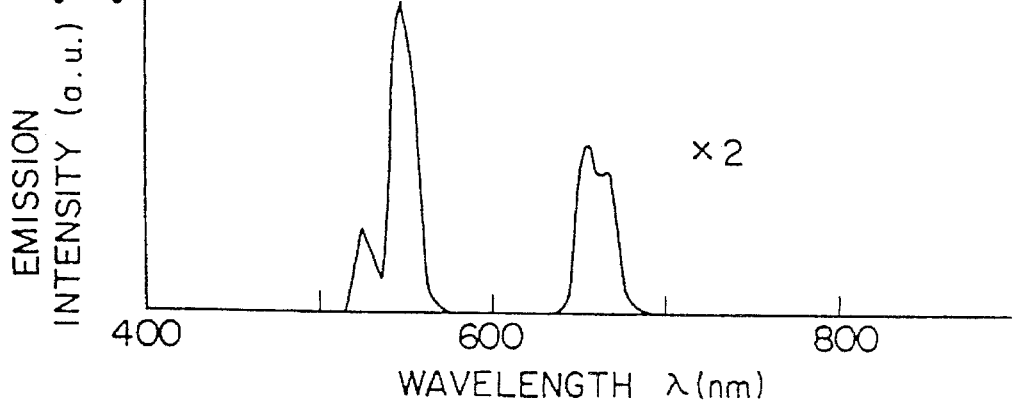

For comparison, a typical fluoride glass having hitherto been developed (35% $AlF_3$, 14% $YbF_3$, 1% $ErF_3$, 20% $PbF_2$, 5% $MgF_2$, 15% $CaF_2$, 10% $BaF_2$, mol %) was prepared using a platinum crucible in a nitrogen atmosphere. It has been confirmed that this glass is not stable because of containing no compound with strong bonding property, but has a high infrared-to-visible conversion efficiency with a same level as the fluoride single crystal. In FIG. 1(c) and FIG. 4 are respectively shown the emission spectrum of the glass when this is irradiated by a semiconductor laser of 980 nm and the excitation power dependence of the emission intensity. The green emission intensity of the fluoride glass was about ½ times as large as that of the transparent glass ceramics of Example 1 and the power dependences of both the glasses were substantially same. Thus, it was confirmed that the material of the present invention exhibited a higher efficiency over from a lower excitation power to a higher excitation light power than the fluoride glass.

Example 2 and Comparative Example 2

Figure 5A:
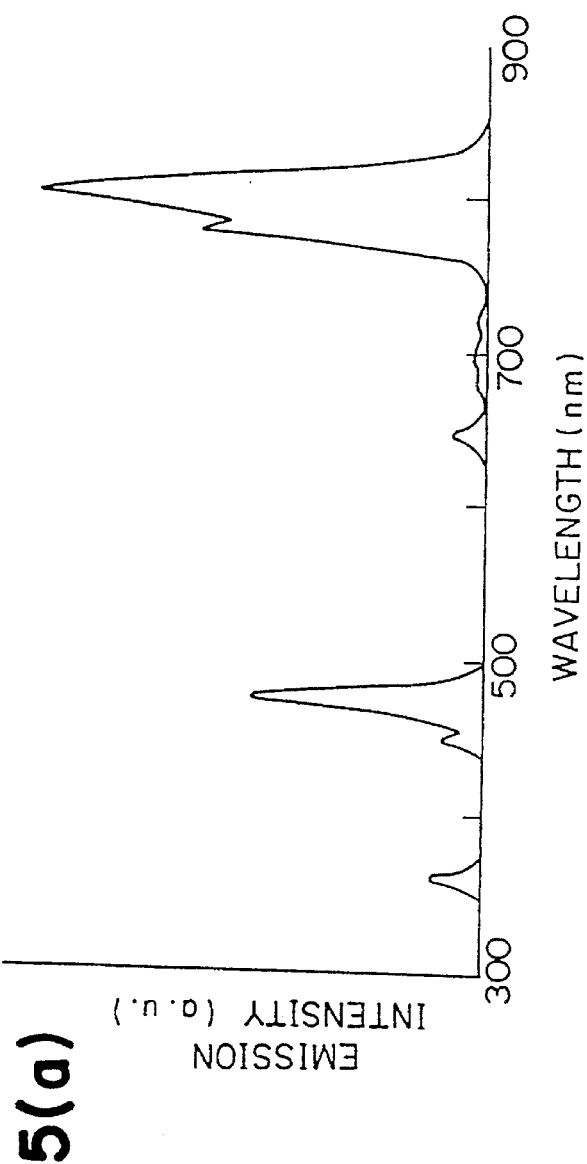
FIG. 5 is an illustration of the visible light emission spectra when (a) the material of Example 2 and (b) $Tm^{3+}$- and $Yb^{3+}$-added fluoride glass are excited by an infrared light of wavelength 980 nm.
Figure 5B:
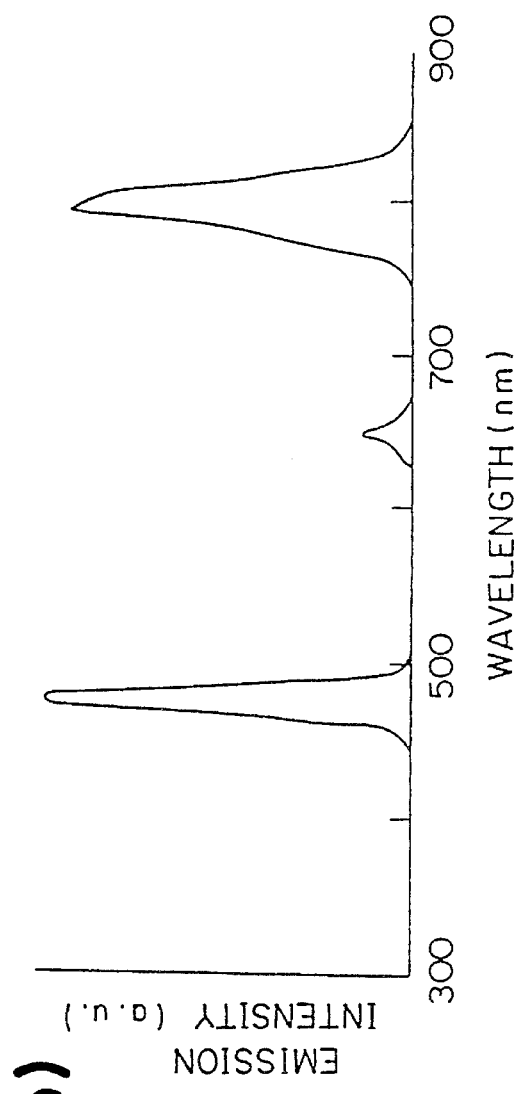

A transparent glass ceramics having a composition of 30% $SiO_2$, 15% $AlO_{1.5}$, 45% $PbF_2$, 10% $YbF_3$ and 0.1% $TmF_3$ (mol %) was prepared in an analogous manner to Example 1. When this sample was irradiated by a laser of 980 nm, blue emission, one of the three primary colors, was strongly observed. This blue emission spectrum is shown in FIG. 5. For comparison, an emission spectrum of a $Yb^{3+}$- and $Tm^{3+}$-co-doped fluoride glass (35% $AlF_3$, 15% $YbF_3$, 20% $PbF_2$, 5% $MgF_2$, 15% $CaF_2$, 10% $BaF_2$, 0.1% $TmF_3$, Comparative Example 2) by 980 nm excitation ia also shown in FIG. 5. All the emissions in the visible range are due to $Tm^{3+}$. As to the emission intensity of 360 nm, the glass ceramics is stronger than the fluoride glass, but both the glasses shows substantially the same blue emission of 480 nm. In FIG. 5, (a) shows an emission spectrum of the glass ceramics of Example 2 and (b) shows that of Comparative Example 2.

Examples 3–6

Samples of Examples 3–6 were prepared in an analogous manner to Example 1 and subjected to measurement of the infrared-to-visible wavelength conversion performance, e.g. the excitation power dependence $S_x$ of the visible light emission intensity when excited by a 980 nm laser, thus obtaining results as shown in Table 1 with the data of Examples 1 and 2.

Advantages of the Present Invention

According to the present invention, there can readily be obtained a transparent glass ceramics with a high infrared-to-visible conversion efficiency and high chemical, mechanical and thermal stability, which can be applied to short wavelength solid lasers, full color displays, infrared light detecting sensors, etc.

TABLE 1

| | Examples | | | | | | Comparative Examples | |
|---|---|---|---|---|---|---|---|---|
| | 1 | 3 | 4 | 2 | 5 | 6 | 1 | 2 |
| $SiO_2$ | 30 | 35 | 30 | 30 | 35 | 30 | | |
| $AlO_{1.5}$ | 15 | 15 | 15 | 15 | 15 | 15 | | |
| $PbF_2$ | 24 | 39 | 44 | 45 | 40 | 40 | | |
| $CdF_2$ | 20 | | | | | | | |
| $YbF_3$ | 10 | 10 | 10 | 10 | 10 | 10 | | |
| $ErF_3$ | 1 | 1 | 1 | | | | | |
| $TmF_3$ | | | | 0.1 | 0.1 | | | |
| $HoF_3$ | | | | | | 0.1 | | |
| $S_{410}$ | 2.60 | 2.62 | 2.60 | | | | 2.74 | |
| $S_{545}$ | 1.68 | 1.82 | 1.85 | | | | 1.87 | |
| $S_{655}$ | 2.14 | 2.13 | 1.90 | | | | 2.12 | |
| $S_{363}$ | | | | 2.81 | 2.96 | | | 3.07 |
| $S_{451}$ | | | | 2.78 | 2.93 | | | 2.95 |
| $S_{477}$ | | | | 1.82 | 2.13 | | | 2.03 |
| $S_{650}$ | | | | | 1.82 | 2.14 | | 2.03 |
| Emission Color | (A) | (A) | (A) | (B) | (B) | (C) | (C) | (B) |
| Emission Intensity | (D) | (D) | (D) | (D) | (D) | (D) | (D) | (D) |

Note:
(A): yellow green; (B): blue; (C): green (D): strong

What is claimed is:

1. A method for producing a transparent glass containing rare earth fluoride crystals, said transparent glass having the following composition:

| | |
|---|---|
| $SiO_2$ | 10–60 mol % |
| $AlO_{1.5}$ | 0–40 mol % |
| $GaO_{1.5}$ | 0–40 mol % |
| $PbF_2$ | 5–60 mol % |
| $CdF_2$ | 0–60 mol % |
| $GeO_2$ | 0–30 mol % |
| $TiO_2$ | 0–10 mol % |
| $ZrO_2$ | 0–10 mol % |
| $ReF_3$ or $ReO_{1.5}$ | 0.05–30 mol % | wherein Re is one or more rare earth elements selected from the group consisting of Er, Tm, Ho, Yb and Pr, said method comprising:

(a) combining powders of each component of said composition to form a mixture thereof;

(b) charging said mixture into a platinum crucible;

(c) uniformly solubilizing said mixture in air at a temperature of about 1000° C.;

(d) casting the solubilized mixture in a carbon mold and annealing said solubilized mixture in a furnace to remove strain therein;

(e) subjecting the annealed product to a temperature greater than the glass transition temperature thereof at which no devitrification occurs; and (f) cooling the resulting product thereby precipitating said rare earth fluoride crystals containing 0.05 to 30 mol % of rare earth ions and said rare earth fluoride crystals having a grain diameter less than a visible light wavelength.

2. The method according to claim 1, wherein the annealed product is heated in step (e) for 7 hours.

3. The method according to claim 1, wherein the annealed product is heated for at least 10 hours.

4. The method according to claim 1, wherein the transparent glass has the following composition:

| | |
|---|---|
| $SiO_2$ | 20–45 mol % |
| $AlO_{1.5}$ | 10–30 mol % |
| $GaO_{1.5}$ | 10–30 mol % |
| $PbF_2$ | 20–50 mol % |
| $CdF_2$ | 10–40 mol % |
| $GeO_2$ | 0–20 mol % |
| $TiO_2$ | 0–6 mol % |
| $ZrO_2$ | 0–6 mol % |
| $ReF_3$ or $ReO_{1.5}$ | 0.5–20 mol %, | wherein Re=Er, Tm, Ho, Yb or Pr.

* * * * *